Patented July 5, 1927.

1,634,735

UNITED STATES PATENT OFFICE.

GEORG BREDIG AND EGON ELÖD, OF KARLSRUHE, GERMANY.

PROCESS FOR PRODUCTION OF HYDROCYANIC ACID.

No Drawing. Application filed January 28, 1924, Serial No. 689,156, and in Germany December 7, 1922.

The object of the present invention is a process of producing hydrocyanic acid by the interaction of carbon monoxide and ammonia in a heated condition, in the presence of oxides of elements of rare earths as catalysts. Suitable catalytically effecting substances may be for example oxides of didymium, lanthanium and especially of cerium and others.

The application of these catalysts presents the advantage that the formation of the hydrocyanic acid may be greatly accelerated. Furthermore the undesirable decomposition of the ammonia which frequently occurred with the processes hitherto known will be avoided as far as possible. Especially in this respect the compounds of the elements of rare earths distinguish themselves over the catalysts of the platinum and iron group which have been hitherto frequently proposed for the synthesis of hydrocyanic acid.

The catalysts in question may be used alone or mixed with one another or mixed with other catalysts. An extraordinary increase of speed of reaction has been produced, for instance by the use of a mixture of cerium oxide with aluminum oxide, preferably in the proportion of 2:1. The catalysts may be used as they are or also on carriers, as for instance clay slabs and the like.

Furthermore it will be possible to use the above-mentioned catalysts with other additions beside aluminum oxide, for instance with additions containing carbides or silicides.

The production of the hydrocyanic acid with the aid of the above-mentioned catalysts can be carried out in the usual manner, for instance, by passing the mixture of the gaseous or vaporous initial substances, that is, ammonia and carbon monoxide, over the catalysts at convenient temperature. Specially good results are obtained by working with a considerable excess of carbon monoxide or substances containing the same, for example, generator gas, gas from coking or the like, and in avoiding too high temperatures. Good outputs in hydrocyanic acid were obtained for example with the proportion of approximately 2—10 volume parts of carbon monoxide to 1 volume part of ammonia. Specially good results were obtained with approximately 5 volume parts of carbon monoxide to 1 volume part of ammonia.

It has further been found that by a considerable addition of hydrogen, or substances containing this gas, the yield may be improved in the above mentioned process. The hydrogen or the substances containing hydrogen, as for instance water gas or gases and vapour from molasses-waste and the like, will act as protecting gases in such a way that the decomposition of ammonia, even under ordinary pressure, is reduced considerably more than when working only with an excess of carbon monoxide gas.

The height of temperature depends on the quality of the catalysts, on the kind of reaction gas and diluting means, the concentration of the gaseous nitrogen compound and on the velocity of flow of the gases. It is generally advisable to select temperatures between 400° and 800° C. Temperatures between 500 and 600° C. are especially advantageous.

When working according to the invention it is possible to convert the nitrogen compound used almost quantitatively into hydrocyanic acid. Further advantage consists in the possibility of working also with moist gases, so that the process of preliminary drying the same is unnecessary. Moreover it is not necessary that the gas be specially pure.

On account of the knowledge of the objections to the use of iron it is advisable to avoid iron and iron compounds, especially also an iron apparatus. The apparatus may preferably consist, for instance, of copper or of ceramic material.

Examples.

1. 60 cubic metres of water gas and 6 cubic metres of ammonia gas are conducted at approximately 600° C. over a catalyst consisting of cerium oxide diluted with aluminium oxide and spread on clay slabs. The result will be per hour about 1.84 kg. of hydrocyanic acid and about 4 cubic metres of undecomposed ammonia.

2. 5 cubic metres of ammonia gas, 15 cubic metres of carbonic oxide gas and 50 cubic metres of hydrogen are conducted at about 600° C. over a contact body with cerium oxide as catalyst. After the gas mixture has passed several times over the contact, approximately 5.3 kg. of hydrocyanic acid are obtained, this being equal to an output of about 95% with regard to the ammonia.

3. 150 cubic metres of water gas and 15 cubic metres of ammonia gas are conducted at 600° C. over a catalyst consisting of cerium oxide spread on silicon carbide or silite. About 4.5 kg. of hydrocyanic acid and about 10 cubic metres of unaltered ammonia are obtained per hour.

4. 3.75 cubic metres of carbonic oxide and 0.75 cubic metres of ammonia gas are conducted at 600° C. over a contact body with thorium oxide as catalyst which has been precipitated on clay slabs. About 145 gr. of hydrocyanic acid and approximately 0.497 cubic metres of unaltered ammonia gas are obtained per hour.

Having now described our invention, what we claim as new and desire to secure by Letters Patent is:—

1. Process for the production of hydrocyanic acid by the interaction of ammonia and carbon monoxide in a heated condition in the presence of a catalyst comprising an oxide of an element of rare earth metal group and in the absence of oxygen.

2. Process for the production of hydrocyanic acid by the interaction of ammonia and an excess of carbon monoxide in a heated condition in the presence of a catalyst comprising an oxide of a rare earth metal.

3. Process for the production of hydrocyanic acid by the interaction of ammonia and an excess of carbon monoxide in a heated condition in the presence of a catalyst comprising an oxide of a rare earth metal and in the absence of oxygen.

4. Process for the production of hydrocyanic acid by the interaction of ammonia and an excess of carbon monoxide in a heated condition in combination with considerable quantities of hydrogen for protecting the ammonia employed and the hydrocyanic acid formed from decomposition, in the presence of a catalyst comprising an oxide of a rare earth metal and in the absence of oxygen.

5. Process for the production of hydrocyanic acid by the interaction of ammonia and carbon monoxide in a heated condition in combination with considerable quantities of hydrogen for protecting the ammonia employed and the hydrocyanic acid formed from decomposition, in the presence of a catalyst comprising an oxide of a rare earth metal.

6. Process for the production of hydrocyanic acid by the interaction of ammonia and an excess of carbon monoxide in a heated condition in combination with considerable quantities of hydrogen for protecting the ammonia employed and the hydrocyanic acid formed from decomposition, in the presence of a catalyst comprising an oxide of a rare earth metal.

7. Process for the production of hydrocyanic acid by the interaction of ammonia and carbon monoxide in a heated condition in combination with considerable quantities of hydrogen for protecting the ammonia employed and the hydrocyanic acid formed from decomposition, in the presence of a catalyst comprising an oxide of a rare earth metal and in the absence of oxygen.

8. Process for the production of hydrocyanic acid by the interaction of ammonia and carbon monoxide in a heated condition in the presence of cerium oxide and in the absence of oxygen.

9. Process for the production of hydrocyanic acid by the interaction of ammonia and carbon monoxide in a heated condition in the presence of contact substances which contain cerium oxide and in the absence of oxygen.

10. Process for the production of hydrocyanic acid by the interaction of ammonia and carbon monoxide in a heated condition in the presence of a catalyst comprising a mixture of cerium oxide with aluminium oxide.

11. Process for the production of hydrocyanic acid by the interaction of ammonia and carbon monoxide in a heated condition in the presence of a catalyst comprising a mixture of cerium oxide and aluminium oxide in the proportion of 2 to 1.

12. Process for the production of hydrocyanic acid by the interaction of ammonia and carbon monoxide in a heated condition in the presence of a catalyst comprising cerium oxide and aluminium oxide in combination with silicon carbide.

13. Process for the production of hydrocyanic acid by the interaction of ammonia and carbon monoxide in a heated condition in the presence of a catalyst comprising cerium oxide and aluminium oxide in combination with carbides of metals of the fourth group.

14. Process for the production of hydrocyanic acid by the interaction of ammonia and an excess of carbon monoxide in a heated condition in the presence of a catalyst comprising cerium oxide.

15. Process for the production of hydrocyanic acid by the interaction of ammonia and carbon monoxide in a heated condition in combination with considerable quantities of hydrogen for protecting the ammonia employed and the hydrocyanic acid formed from decomposition in the presence of a catalyst comprising cerium oxide.

16. Process for the production of hydrocyanic acid by the interaction of ammonia and an excess of carbon monoxide in a heated condition in combination with considerable quantities of hydrogen for protecting the ammonia employed and the hydrocyanic acid formed from decomposition, in the presence of a catalyst comprising cerium oxide.

17. Process for the production of hydrocyanic acid by the interaction of ammonia and carbon monoxide in a heated condition in combination with considerable quantities of hydrogen for protecting the ammonia employed and the hydrocyanic acid formed from decomposition, in the presence of a catalyst comprising a mixture of cerium oxide with aluminium oxide.

18. Process for the production of hydrocyanic acid by the interaction of ammonia and an excess of carbon monoxide in a heated condition in the presence of a catalyst comprising a mixture of cerium oxide with aluminium oxide.

19. Process for the production of hydrocyanic acid by the interaction of ammonia and an excess of carbon monoxide in a heated condition in combination with considerable quantities of hydrogen for protecting the ammonia employed and the hydrocyanic acid formed from decomposition, in the presence of a catalyst comprising a mixture of cerium oxide with aluminium oxide.

20. Process for the production of hydrocyanic acid by the interaction of ammonia and carbon monoxide in a heated condition in combination with considerable quantities of hydrogen for protecting the ammonia employed and the hydrocyanic acid formed from decomposition, in the presence of a catalyst comprising a mixture of cerium oxide and aluminium oxide in the proportion of 2 to 1.

21. Process for the production of hydrocyanic acid by the interaction of ammonia and an excess of carbon monoxide in a heated condition in the presence of a catalyst comprising a mixture of cerium oxide and aluminium oxide in the proportion of 2 to 1.

22. Process for the production of hydrocyanic acid by the interaction of ammonia and an excess of carbon monoxide in a heated condition in combination with considerable quantities of hydrogen for protecting the ammonia employed and the hydrocyanic acid formed from decomposition, in the presence of a catalyst comprising a mixture of cerium oxide and aluminium oxide in the proportion of 2 to 1.

In testimony whereof we affix our signatures.

GEORG BREDIG.
EGON ELÖD.